Aug. 15, 1939.  F. C. LINN  2,169,878
LUBRICATING ARRANGEMENT
Filed Oct. 26, 1937
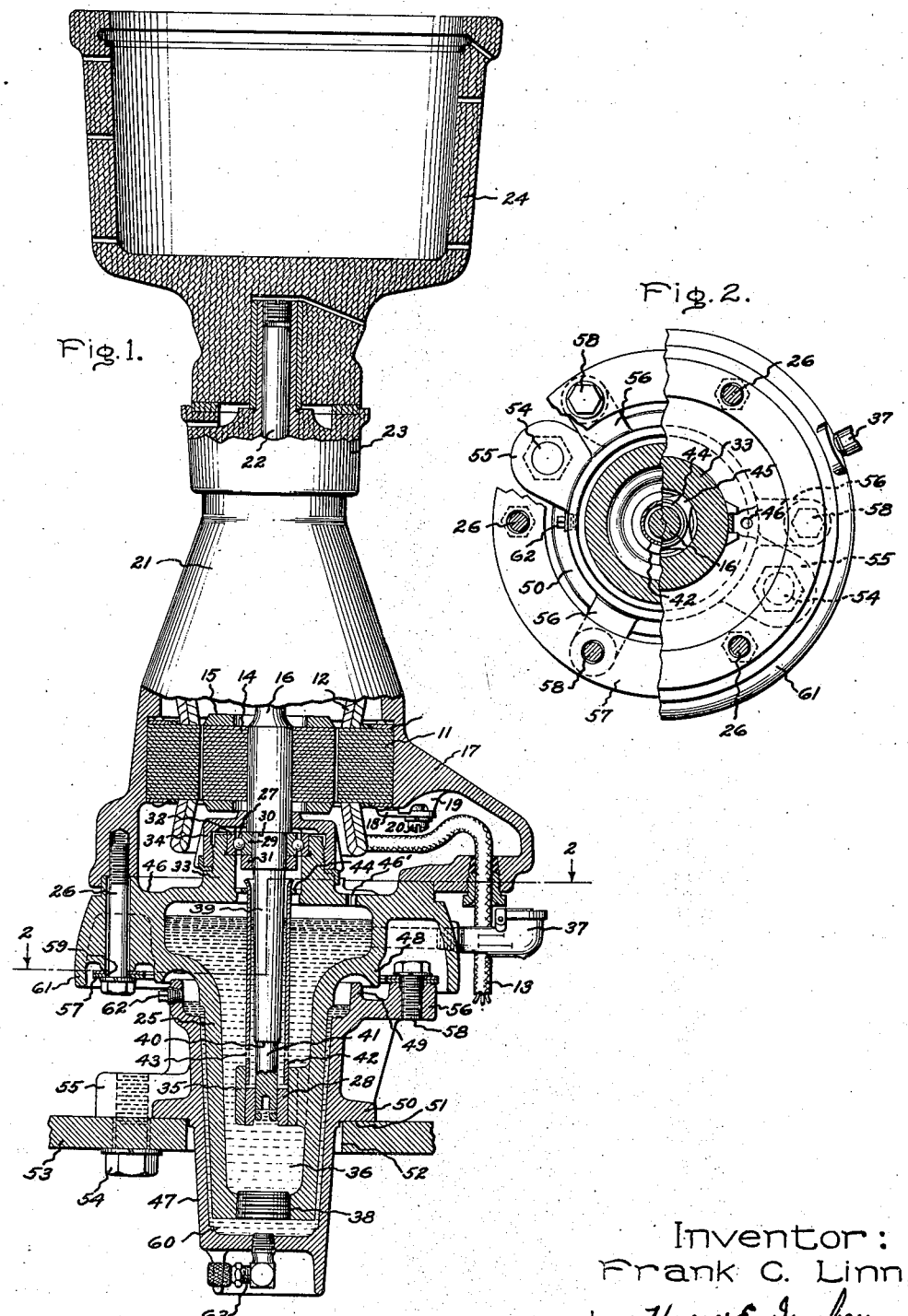
Inventor:
Frank C. Linn,
by Harry E. Dunham
His Attorney Patented Aug. 15, 1939

2,169,878

UNITED STATES PATENT OFFICE 2,169,878

LUBRICATING ARRANGEMENT

Frank C. Linn, Swampscott, Mass., assignor to General Electric Company, a corporation of New York Application October 26, 1937, Serial No. 171,045

5 Claims. (Cl. 308—187)

My invention relates to bearing lubricating arrangements, and more particularly to lubricating arrangements for high-speed vertical shaft spinning devices, such as vertical shaft motors.

An object of my invention is to provide an improved bearing lubricating arrangement for a spinning device or the like.

Further objects and advantages of my invention will become apparent and my invention will be better understood from the following description referring to the accompanying drawing, and the features of novelty which characterize my invention will be pointed out with particularity in the claims annexed to and forming a part of this specification.

In the drawing, Fig. 1 is a partial sectional elevation of a spinning motor embodying my invention; and Fig. 2 is a sectional view taken along the line 2—2 of Fig. 1, with a part of the bearing housing broken away.

Referring to the drawing, I have shown a spinning motor embodying my invention constructed similar to the spinning device disclosed and claimed in my copending application Serial No. 130,533, filed March 12, 1937, and assigned to the General Electric Company, assignee of this application. This motor is provided with a stationary member 10 including a core structure 11 provided with a suitable stator field exciting winding 12. The motor is energized by current from a source of electrical power supply connected to the stator winding terminal 13. A rotatable member 14 having a squirrel cage winding 15 is mounted on an upwardly extending shaft 16 arranged to drive a spinning device. The stationary member of the motor is secured in a housing 17 by clamps 18 attached to flanges 19 by screws 20. An upper end shield portion 21 of the housing 17 is formed with an axial opening therein through which the upper end 22 of the shaft 16 extends, and an adaptor 23 is mounted on this tapered upper end 22 of the shaft and supports a removable spinning bucket 24. In order to protect the upper portion 22 of the drive shaft and the motor from material which may be spilled out of the spinning bucket, the portion 21 of the housing 17 extends vertically thereabout and fits within the lower portion of the flanged adaptor 23.

The lower end shield of the motor is provided with an elongated hollow bearing housing 25 arranged to support the motor and the spinning device, and is secured to the stator housing 17 by three screws 26 equidistantly spaced about the upper periphery of the bearing housing 25. In order to support the rotatable member of the motor a ball bearing 27 is arranged intermediate the ends of the shaft 16 and a sleeve bearing 28 is arranged about the lower end thereof. The ball bearing 27 is provided with an inner race 29 tightly fitted on the shaft 16 below the rotatable member 14 of the motor and is secured in position between a shoulder 30 on the shaft 16 and a collar 31 which is press-fitted on the shaft 16 below the bearing race 29. An outer bearing race 32 is fitted within a flange or hub 33 formed on the upper end of the bearing housing 25 in spaced relation to the shaft 16. A bearing cover plate 34 is secured by threaded engagement with the hub 33 and extends over the ball bearings 27 about the shaft 16, so as to prevent the flow of lubricating oil past the bearing to the motor 14, and clamps in position the outer race 32 of the ball bearing. The sleeve bearing 28 is mounted in a boss 35 formed on the interior of the lower end of the bearing housing 25. This bearing housing serves as a lubricant reservoir, and lubricating oil 36 can be supplied thereto through a filling cup 37 secured to the upper end of the housing. A drain plug 38 is threaded in an opening formed in the bottom of the bearing housing 25 for emptying the lubricant reservoir when desired.

In order to lubricate the ball bearing 27, the shaft 16 is provided with a tapered portion 39 extending below the bearing 27 and terminating in a downwardly presented shoulder 40 formed thereon, and a portion of reduced section 41 extending downwardly from the shoulder 40 and supported by the sleeve bearing 28. A thin axially extending cylindrical sleeve 42 is arranged in closely spaced relation about the tapered portion 39 of the drive shaft and is supported by the sleeve bearing supporting boss 35 on the bearing housing. Small openings 43 are formed in the sleeve 42 below the shoulder 40 and above the boss 35 to provide a communication between the interior of the sleeve 42 and the lubricant reservoir in the bearing housing 25 in order to provide for the admission of lubricant into the space between the sleeve 42 and the shaft 16. The upper end of the cylindrical sleeve 42 is secured within the hub 33 by a spring washer 44 having fingers 45 which engage the inner surface of the hub 33, and this upper end of the sleeve 42 is open and communicates with the space within the hub around the ball bearing 27. When the drive shaft 16 rotates at normal operating speeds from about 6,000 to 10,000 R. P. M., the shoulder 40 on the shaft forms bubbles in the lubricating oil around the shaft, and, since these bubbles are lighter than the surrounding oil, they travel up between the tapered portion 39 of the shaft and the sleeve 42, and more lubricant enters the sleeve through the openings 43. In order to obtain this operation, the openings 43 in the sleeve 42 are formed below the shoulder 40 on the shaft and the sleeve is imperforate from below the shoulder 40 on the shaft to the upper end of the sleeve, as otherwise the bubbles might escape through these openings into the lubricant reservoir without passing up between the sleeve and the shaft. Since the lubricant bubbles are lighter than the lubricant in the reservoir the lubricant pressure in the reservoir causes them to rise to a higher level in the sleeve than the reservoir lubricant level, and, as they flow over the top of the sleeve, they are sprayed by centrifugal force against the inner wall or surface of the hub 33 by the collar 31. In this manner the collar 31 on the shaft 16 cooperates with the hub 33 to supply lubricant from the top of the sleeve 42 to the ball bearings 27, as a portion of the lubricant forming the oil bubbles which strike the surface of the hub 33 forms a light vapor which rises and lubricates the ball bearings 27. The openings between the fingers 45 of the washer 44 and the hub 33 provide for drainage of any excess lubricant from the bearing 27 back into the reservoir within the bearing housing 25. The upper surface of the bearing housing 25 is formed with a groove 46 and is provided with an opening 46' communicating with the interior of the bearing housing so that any oil which might flow past the cover plate 34 will drain back into the lubricant reservoir formed by the bearing housing.

The cup-shaped stationary housing 47 is arranged in closely spaced relation about the lower reduced portion of the bearing housing 25, and an annular overhanging flange 48 is formed on the upper portion of the bearing housing adjacent the lower reduced portion thereof and extends about an upwardly extending flange 49 formed on the top of the stationary housing 47. This arrangement forms a seal about the top of the stationary housing 47 and excludes foreign substances, such as acids, used in the spinning process. A radially extending annular flange 50 is provided with a finished surface 51 and is arranged to engage a finished surface around an opening 52 in a spinning frame 53 through which the lower portion of the housing 47 extends. The housing 47 is rigidly secured to the spinning frame 53 by screws 54 extending through the spinning frame and threaded into bosses 55 formed on the housing 47. Three radially extending arms 56 project axially from the housing 47, and an annular flexible laminated disk 57 is secured to the arms 56 at three equidistantly spaced points about its periphery by screws 58. The flexible disk 57 is provided with holes 59 at three other points spaced intermediate the first-mentioned points, and the bolts 26 which secure the bearing housing 25 to the motor housing 17 extend through the holes 59 and secure the flexible disk 57 to the upper end of the bearing housing 25. In this manner, the lower portion of the bearing housing extends into the housing 47 for damping oscillations thereof by a damping fluid 60 retained in the housing 47 in the space between the bearing housing 25 and the stationary housing 47. An annular overhanging flange 61 is formed on the bearing housing 25 and extends over the entire supporting arrangement, thereby shielding it from foreign substances. A filling opening is formed on the stationary housing 47, and the damping fluid 60 can be supplied to the space between the bearing housing and the stationary housing by removal of a filling plug 62, and a drain plug 63 is threaded into an opening in the bottom of the housing 47 to facilitate removal of the damping fluid 60.

While I have illustrated and described one embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A lubricating arrangement including a bearing, a housing arranged to support said bearing, an upwardly extending shaft supported by said bearing and having a portion extending below said bearing, a sleeve supported by said housing in closely spaced relation about said portion of said shaft below said bearing, means adjacent the lower end of said sleeve for supplying lubricant thereto, said sleeve being imperforate from said last-mentioned means to the upper end thereof, and means carried by said shaft above said lubricant supply means and cooperating with said sleeve for supplying lubricant to said bearing.

2. A lubricating arrangement for a spinning device having an upwardly extending shaft and a bearing for said shaft, a bearing housing provided with a lubricant reservoir and arranged to support said bearing, means including a second bearing adjacent the lower end of said shaft within said bearing housing for supporting said shaft, a sleeve supported by said housing in closely spaced relation about said shaft from adjacent the lower end thereof extending to adjacent said first-mentioned bearing, openings formed in said sleeve adjacent the lower end thereof, said sleeve being imperforate from adjacent said openings to the upper end thereof, and means on said shaft above said openings for supplying lubricant to said first-mentioned bearing.

3. A lubricating arrangement for a spinning device provided with an upwardly extending shaft having a shoulder thereon and a portion of reduced section extending downwardly therefrom and a bearing arranged above said shoulder to support said shaft, a bearing housing provided with a lubricant reservoir and arranged to support said bearing, a sleeve supported by said housing in closely spaced relation about said shaft, said sleeve being imperforate from below said shoulder to the upper end thereof, and an opening formed in said sleeve below said shoulder on said shaft communicating with said lubricant reservoir.

4. A lubricating arrangement for a spinning device having an upwardly extending shaft having a shoulder thereon and a portion of reduced section extending therefrom adjacent the lower end of said shaft and a bearing arranged above said shoulder to support said shaft, a bearing housing provided with a lubricant reservoir and arranged to support said bearing, a sleeve supported by said housing in closely spaced relation about said shaft extending from below said shoulder to adjacent said bearing, said sleeve being imperforate from below said shoulder to the upper end thereof, openings formed in said sleeve below said shoulder on said shaft and communicating with said lubricant reservoir, and means including a collar on said shaft adjacent said bearing for supplying lubricant from the top of said sleeve to said bearing.

5. A lubricating arrangement for a bearing including an upwardly extending shaft arranged to be supported by said bearing and provided with a tapered portion extending below said bearing having a shoulder and a portion of reduced section extending from said shoulder, a bearing housing provided with a lubricant reservoir and having an axially extending hub spaced from said shaft and arranged to support said bearing, a sleeve supported by said housing in closely spaced relation about said shaft extending from below said shoulder to adjacent said bearing, said sleeve being imperforate from below said shoulder to the upper end thereof, openings formed in said sleeve below said shoulder on said shaft and communicating with said lubricant reservoir, and a collar on said shaft adjacent said bearing and above said sleeve arranged to cooperate with said hub to supply lubricant from the top of said sleeve to said bearing.

FRANK C. LINN.